UNITED STATES PATENT OFFICE.

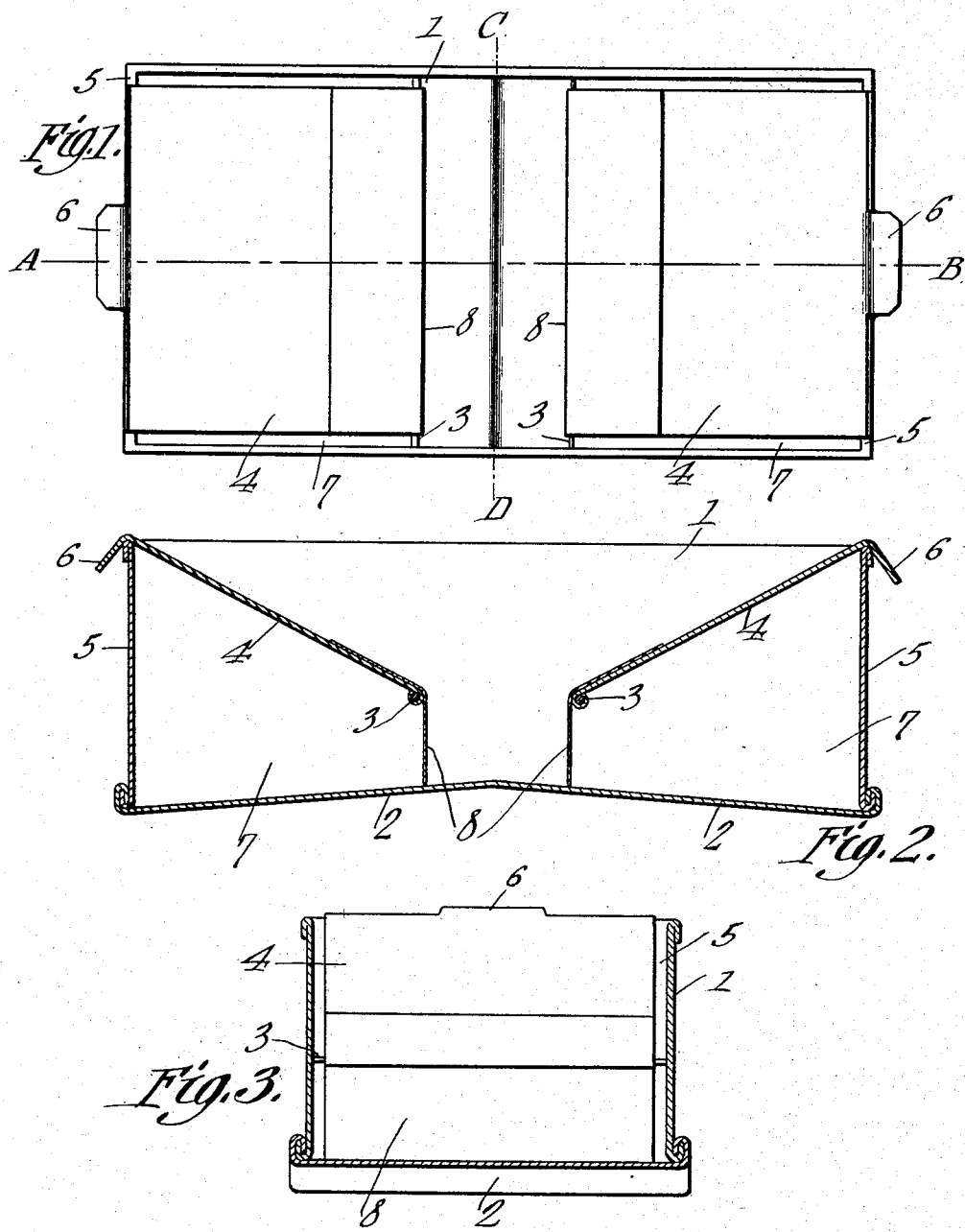

JOHN J. SPLITEK, OF FAITH, SOUTH DAKOTA, ASSIGNOR OF ONE-HALF TO GILBERT LEE, OF FAITH, SOUTH DAKOTA.

HEN'S NEST.

1,172,494.     Specification of Letters Patent.     Patented Feb. 22, 1916.

Application filed August 30, 1915. Serial No. 48,030.

*To all whom it may concern:*

Be it known that I, JOHN J. SPLITEK, a citizen of the United States, residing at Faith, in the county of Meade and State of South Dakota, have invented a new and useful Hen's Nest, of which the following is a specification.

This invention relates to a hen's nest, one of the objects of the invention being to provide a nest having separate compartments into which the eggs are adapted to gravitate after being laid so that they will be out of the reach of the hen and will thus be saved from injury.

A further object is to provide a device of this character the egg receiving compartments of which can be opened readily to permit the removal of the contents thereof.

Another object is to provide a nest which is cheap to manufacture, compact and durable.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the device. Fig. 2 is a section on line A—B Fig. 1. Fig. 3 is a section on line C—D Fig. 1.

Referring to the figures by characters of reference 1 designates a box-like body formed of any suitable material and of any desired proportions, the bottom of this body being inclined downwardly from the center toward the ends thereof, as shown at 2. Extending transversely within the body at opposite sides of the center thereof are pivot rods 3 and mounted on each of these pivot rods is the lower or inner end of a door 4 which extends practically throughout the width of the interior of the body and bears, at its outer end, against the upper edge of one end wall 5 of the body. The upper or outer end portion of each door may be provided with an ear 6 constituting a finger piece whereby the door can be swung upwardly readily to permit access to be had to the interior of the compartment 7 formed below the door. A curtain 8 is connected to the inner end portion of each door and is adapted to hang in the space between the compartments 7. The distance between the inner ends of the doors 4 and the bottom 2 of the body is such as to permit an egg to gravitate readily along the inclined portion of the bottom 2 into either of the compartments 7.

It will be obvious that when the device herein described is in use, an egg when laid will gravitate to the space between the lower ends of the doors 4 and will then roll along the inclined bottom 2 into one of the compartments 7 where it will be out of reach by the hen. The egg can be removed readily simply by swinging the door 4 upwardly.

What is claimed is:—

1. A hen's nest including a body having its bottom inclined downwardly from the center thereof, opposed upwardly diverging spaced doors extending transversely within the body and forming separate compartments thereunder, and projecting portions upon the upper ends of the doors.

2. A hen's nest including a body having its bottom inclined downwardly from the center thereof, opposed upwardly diverging spaced doors extending transversely within the body and forming separate compartments thereunder, and a curtain depending from the inner end portion of each door.

3. A hen's nest including a box-like body having its bottom inclined downwardly toward the ends thereof from the center, upwardly diverging hinged doors mounted transversely within the body and resting upon the upper ends of the end walls of the body, there being egg receiving spaces between the doors and between the lower end portion of each door and the bottom of the body, said doors and bottom forming egg receiving compartments in the end portions of the body, and curtains secured to the doors and normally closing the egg receiving openings under the inner ends of the doors.

In testimony that I claim the foregoing as my own, I have hereto affixed my signature in the presence of two witnesses.

JOHN J. SPLITEK.

Witnesses:
  Geo. W. Gebhard,
  Henry E. Reede.

Copies of this patent may be obtained for five cents each, by addressing the "Commissioner of Patents, Washington, D. C."